United States Patent
Prins et al.

(10) Patent No.: US 12,510,275 B2
(45) Date of Patent: Dec. 30, 2025

(54) METHOD FOR CONTROLLING A VAPOUR COMPRESSION SYSTEM WITH A BYPASS VALVE

(71) Applicant: Danfoss A/S, Nordborg (DK)

(72) Inventors: Jan Prins, Nordborg (DK); Peter Reichwald, Nordborg (DK); Salvatore Piscopiello, Nordborg (DK)

(73) Assignee: DANFOSS A/S, Nordborg (DK)

( * ) Notice: Subject to any disclaimer, the term of this patent is extended or adjusted under 35 U.S.C. 154(b) by 144 days.

(21) Appl. No.: 18/550,814

(22) PCT Filed: Feb. 18, 2022

(86) PCT No.: PCT/EP2022/054094
§ 371 (c)(1),
(2) Date: Sep. 15, 2023

(87) PCT Pub. No.: WO2022/194488
PCT Pub. Date: Sep. 22, 2022

(65) Prior Publication Data
US 2024/0142150 A1 May 2, 2024

(30) Foreign Application Priority Data
Mar. 18, 2021 (EP) .................... 21163494

(51) Int. Cl.
*F25B 49/02* (2006.01)
*F25B 41/20* (2021.01)

(52) U.S. Cl.
CPC ............. *F25B 49/02* (2013.01); *F25B 41/20* (2021.01); *F25B 2400/0409* (2013.01); *F25B 2600/2501* (2013.01)

(58) Field of Classification Search
CPC ...... F25B 2400/0409; F25B 2400/0415; F25B 2400/06; F25B 2400/23; F25B 2600/2501; F25B 41/20; F25B 41/39; F25B 49/02
See application file for complete search history.

(56) References Cited

U.S. PATENT DOCUMENTS 9,395,112 B2  7/2016  Prins
10,544,971 B2  1/2020  Fredslund et al.
(Continued)

FOREIGN PATENT DOCUMENTS

CN   1151008 A   6/1997
CN   1514193 A   7/2004
(Continued)

OTHER PUBLICATIONS

International Search Report mailed on Apr. 7, 2022, in connection with corresponding International Application No. PCT/EP2022/054094; 3 pages.

*Primary Examiner* — Henry T Crenshaw
(74) *Attorney, Agent, or Firm* — McCormick, Paulding & Huber PLLC

(57) ABSTRACT

The vapour compression system includes a compressor unit having at least one main compressor and at least one receiver compressor, a heat rejecting heat exchanger, a receiver, an expansion device and an evaporator being arranged in a refrigerant path. The vapour compression system further includes a bypass valve fluidly interconnecting the gaseous outlet of the receiver and the main compressor(s). An opening degree of the bypass valve is controlled to regulate the pressure prevailing in the receiver in accordance with a first pressure setpoint when a load demand of the vapour compression system exceeds a maximum capacity of the receiver compressor(s). The opening degree of the bypass valve is controlled to regulate the pressure prevailing in the
(Continued)

receiver in accordance with a second pressure setpoint when the receiver compressor(s) is/are operating and the load demand of the vapour compression system is below the maximum capacity of the receiver compressor(s).

15 Claims, 2 Drawing Sheets

(56) References Cited

U.S. PATENT DOCUMENTS

| | | | |
|---|---|---|---|
| 10,775,086 B2 | 9/2020 | Prins et al. | |
| 10,928,107 B2 | 2/2021 | Schmidt et al. | |
| 10,941,964 B2 | 3/2021 | Fredslund et al. | |
| 11,029,068 B2 * | 6/2021 | Christensen | F25B 9/008 |
| 11,340,000 B2 | 5/2022 | Schmidt et al. | |
| 11,460,230 B2 | 10/2022 | Prins et al. | |
| 2006/0277932 A1 | 12/2006 | Otake et al. | |
| 2011/0192176 A1 | 8/2011 | Kim et al. | |
| 2014/0260341 A1 | 9/2014 | Vaisman et al. | |
| 2016/0102901 A1 | 4/2016 | Christensen et al. | |
| 2017/0321941 A1 * | 11/2017 | Fredslund | F25B 41/39 |
| 2017/0328604 A1 * | 11/2017 | Fredslund | F25B 41/39 |
| 2018/0031282 A1 | 2/2018 | Woo et al. | |
| 2018/0283750 A1 * | 10/2018 | Prins | F25B 49/02 |
| 2019/0299132 A1 | 10/2019 | Prins et al. | |
| 2019/0376728 A1 | 12/2019 | Hayes et al. | |
| 2020/0124330 A1 | 4/2020 | Hayes | |
| 2022/0034566 A1 | 2/2022 | Prins et al. | |
| 2022/0196305 A1 | 6/2022 | Prins et al. | |

FOREIGN PATENT DOCUMENTS

| | | |
|---|---|---|
| CN | 104136865 A | 11/2014 |
| CN | 107709894 A | 2/2018 |
| CN | 108139131 A | 6/2018 |
| CN | 112513542 A | 3/2021 |
| EP | 2 999 932 B1 | 7/2019 |
| EP | 3 581 860 A1 | 12/2019 |
| EP | 3 628 940 A1 | 4/2020 |
| WO | 2014/179442 A1 | 11/2014 |
| WO | WO 2014-179442 * | 11/2014 |
| WO | 2017/067858 A1 | 4/2017 |

* cited by examiner

METHOD FOR CONTROLLING A VAPOUR COMPRESSION SYSTEM WITH A BYPASS VALVE

CROSS-REFERENCE TO RELATED APPLICATIONS

This application is a National Stage application of International Patent Application No. PCT/EP2022/054094, filed on Feb. 18, 2022, which claims priority to European Patent Application No. 21163494.4, filed on Mar. 18, 2021, each of which is hereby incorporated by reference in its entirety.

TECHNICAL FIELD

The present invention relates to a method for controlling a vapour compression system with a receiver, in order to maintain a desired pressure in the receiver. In the method according to the invention, the pressure prevailing in the receiver is regulated by controlling a receiver compressor or by controlling an opening degree of a bypass valve. Furthermore, appropriate regulation of the pressure prevailing in the receiver is obtained in an energy efficient manner, regardless of the load demand of the vapour compression system.

BACKGROUND

Vapour compression systems, such as refrigeration systems, air condition systems or heat pumps, normally comprise a compressor unit comprising one or more compressors, a heat rejecting heat exchanger, an expansion device and an evaporator arranged in a refrigerant path. Refrigerant flowing in the refrigerant path is thereby compressed by the compressor(s) of the compressor unit before being supplied to the heat rejecting heat exchanger. When passing through the heat rejecting heat exchanger, heat exchange takes place between the refrigerant and the ambient or a secondary fluid flowing across the heat rejecting heat exchanger, in such a manner that heat is rejected from the refrigerant. The refrigerant then passes through the expansion device, where it undergoes expansion, before being supplied to the evaporator. The refrigerant being supplied to the evaporator is in the form of a mixture of gaseous and liquid refrigerant. When passing through the evaporator, the liquid part of the refrigerant is evaporated, while heat exchange takes place between the refrigerant and the ambient or a secondary fluid flow across the evaporator, in such a manner that heat is absorbed by the refrigerant.

In some vapour compression systems a receiver is arranged in the refrigerant path between the heat rejecting heat exchanger and the expansion device. In the receiver, the refrigerant is separated into a gaseous part and a liquid part. The liquid part of the refrigerant is supplied to the expansion device, via a liquid outlet, in the manner described above. The gaseous part of the refrigerant may be supplied to the compressor unit, via a gaseous outlet. In this case the gaseous refrigerant may be supplied to the suction line which interconnects the outlet of the evaporator and the compressor unit, via a bypass valve. Alternatively, the gaseous refrigerant may be supplied directly to a dedicated receiver compressor, which does not receive refrigerant from the evaporator. Supplying the gaseous refrigerant to a receiver compressor is more energy efficient than supplying it to the suction line, via a bypass valve, or supplying it to the expansion device, because thereby a pressure drop is not introduced, and therefore the energy required in order to compress the refrigerant to a desired pressure level is lower.

It is necessary to maintain the pressure prevailing in the receiver at a certain level, in order to ensure that the vapour compression system operates in an appropriate manner. The pressure prevailing in the receiver may be regulated by appropriately operating the receiver compressor and/or an opening degree of the bypass valve. It is desirable to apply the receiver compressor whenever this is possible, because this is more energy efficient than applying the bypass valve, as described above. However, when the flow of gaseous refrigerant out of the receiver is low, it may be insufficient to maintain stable operation of the receiver compressor, thereby leading to repeated stops and starts of the receiver compressor and causing excessive wear on the receiver compressor. Under such circumstances it is more desirable to apply the bypass valve.

Furthermore, in order to allow the pressure prevailing in the receiver to be regulated by operating the receiver compressor under circumstances where the load on the vapour compression system is exceptionally high, the capacity of the receiver compressor is sometimes dimensioned in such a manner that the maximum capacity of the receiver compressor is rarely, or even never, used. This adds to the costs of manufacturing the vapour compression system.

Furthermore, when the pressure prevailing in the receiver is controlled by means of receiver compressors as well as by means of a bypass valve, there is a risk the control of the receiver compressors and the control of the bypass valve may conflict with each other.

EP 2 999 932 B1, corresponding to WO 2014/179442 A1, discloses a method for pressure control in a $CO_2$ refrigeration system. A controller receives a pressure measurement from a pressure sensor within a receiving tank and operates both a gas bypass valve and a parallel compressor, in response to the pressure measurement, to control the pressure within the receiving tank. The controller compares the pressure within the receiving tank with both a first threshold pressure and a second threshold pressure. The controller controls the pressure within the receiving tank using only the gas bypass valve when the pressure within the receiving tank is between the first threshold pressure and the second threshold pressure, and using both the gas bypass valve and the parallel compressor when the pressure within the receiving tank exceeds the second threshold pressure.

SUMMARY

It is an object of embodiments of the invention to provide a method for controlling a vapour compression system which allows appropriate regulation of the pressure prevailing in the receiver, without excessive manufacturing costs of the vapour compression system.

It is a further object of embodiments of the invention to provide a method for controlling a vapour compression system, in which the risk of conflicts between controlling a receiver compressor and a bypass valve is minimised.

The invention provides a method for controlling a vapour compression system, the vapour compression system comprising a compressor unit comprising at least two compressors, a heat rejecting heat exchanger, a receiver, an expansion device and an evaporator being arranged in a refrigerant path, the expansion device being arranged to control a supply of refrigerant to the evaporator, at least one of the compressors being a main compressor being fluidly connected to an outlet of the evaporator and at least one of the compressors being a receiver compressor being fluidly connected to a gaseous outlet of the receiver, the vapour compression system further comprising a bypass valve fluidly interconnecting the gaseous outlet of the receiver and the main compressor(s), the method comprising the steps of:

defining a first pressure setpoint for a pressure prevailing in the receiver and a second pressure setpoint for the pressure prevailing in the receiver, the second pressure setpoint being higher than the first pressure setpoint, and controlling an opening degree of the bypass valve, wherein the opening degree of the bypass valve is controlled in order to regulate the pressure prevailing in the receiver in accordance with the first pressure setpoint, and in order to reach the first pressure setpoint, in the case that a load demand of the vapour compression system exceeds a maximum capacity of the receiver compressor(s), and wherein the opening degree of the bypass valve is controlled in order to regulate the pressure prevailing in the receiver in accordance with the second pressure setpoint, and in order to reach the second pressure setpoint, in the case that the receiver compressor(s) is/are operating and the load demand of the vapour compression system is below the maximum capacity of the receiver compressor(s).

Thus, the invention provides a method for controlling a vapour compression system. In the present context the term 'vapour compression system' should be interpreted to mean any system in which a flow of fluid medium, such as refrigerant, circulates and is alternatingly compressed and expanded, thereby providing either refrigeration or heating of a volume. Thus, the vapour compression system may be a refrigeration system, an air condition system, a heat pump, etc.

Accordingly, the vapour compression system comprises a compressor unit, a heat rejecting heat exchanger, a receiver, an expansion device and an evaporator arranged in a refrigerant path. The expansion device is arranged to control a supply of refrigerant to the evaporator. The compressor unit comprises at least two compressors. At least one of the compressors is a main compressor being fluidly connected to an outlet of the evaporator, and at least one of the compressors is a receiver compressor being fluidly connected to a gaseous outlet of the receiver. The vapour compression system further comprises a bypass valve fluidly interconnecting the gaseous outlet of the receiver and the main compressor(s).

Thus, refrigerant flowing in the refrigerant path is compressed by the compressors of the compressor unit before being supplied to the heat rejecting heat exchanger. When the refrigerant passes through the heat rejecting heat exchanger, heat exchange takes place between the refrigerant and the ambient or a secondary fluid flow across the heat rejecting heat exchanger, in such a manner that heat is rejected from the refrigerant. The heat rejecting heat exchanger may be in the form of a condenser, in which case the refrigerant is at least partly condensed when passing through the heat rejecting heat exchanger. As an alternative, the heat rejecting heat exchanger may be in the form of a gas cooler, in which case the refrigerant passing through the heat rejecting heat exchanger is cooled, but remains in a gaseous or trans-critical state.

The refrigerant leaving the heat rejecting heat exchanger is supplied to the receiver, possibly via a high pressure valve or an ejector. In the receiver, the refrigerant is separated into a liquid part and a gaseous part. The liquid part of the refrigerant leaves the receiver via a liquid outlet, and is supplied to the evaporator, via the expansion device. In the expansion device, the refrigerant undergoes expansion, and the refrigerant supplied to the evaporator is in a mixed state of gaseous and liquid refrigerant. In the evaporator, the liquid part of the refrigerant is at least partly evaporated, while heat exchange takes place between the refrigerant and the ambient or a secondary fluid flow across the evaporator, in such a manner that heat is absorbed by the refrigerant. Finally, the refrigerant leaving the evaporator is supplied to the main compressor(s).

The gaseous part of the refrigerant in the receiver may leave the receiver via the gaseous outlet, and is either supplied directly to the receiver compressor(s) or to the main compressor(s), via the bypass valve.

In the method according to the invention, a first pressure setpoint for a pressure prevailing in the receiver and a second pressure setpoint for the pressure prevailing in the receiver are initially defined. The second pressure setpoint is higher than the first pressure setpoint. In the present context the term 'pressure setpoint' should be interpreted to mean a pressure value which can be applied in a setpoint control of the pressure prevailing in the receiver, i.e. each of the first pressure setpoint and the second pressure setpoint represents a pressure level which can be selected as a target value for a control loop with respect to the pressure prevailing in the receiver.

The first pressure setpoint may advantageously represent a pressure level which is desired in the receiver under the given operating conditions. The pressure prevailing in the receiver should be maintained at a level which ensures appropriate and efficient operation of the vapour compression system, e.g. by ensuring a sufficient pressure difference across the expansion device to ensure a sufficient refrigerant supply to the evaporator. It is known per se how to select an appropriate pressure setpoint for the receiver pressure.

The second pressure setpoint is higher than the first pressure setpoint and may be applied during certain circumstances which will be described in further detail below. The second pressure setpoint may be defined based on the first pressure setpoint, e.g. by adding a fixed offset value to the first pressure setpoint.

The opening degree of the bypass valve is controlled in the following manner.

In the case that a load demand of the vapour compression system exceeds a maximum capacity of the receiver compressor(s), the opening degree of the bypass valve is controlled in order to regulate the pressure prevailing in the receiver in accordance with the first pressure setpoint, i.e. the lower pressure setpoint, and in order to reach the first pressure setpoint, i.e. in order to reach a pressure level in the receiver which is equal to the first pressure setpoint.

In the present context, the term 'load demand of the vapour compression system' should be interpreted to mean a current need for the vapour compression system to provide cooling or heating. In order for the vapour compression system to be able to meet this need, a certain amount of refrigerant must be compressed by the compressors of the vapour compression system, and a certain amount of gaseous refrigerant must be removed from the receiver. In the case that the amount of gaseous refrigerant which needs to be removed from the receiver exceeds the amount of refrigerant which the receiver compressor(s) is/are capable of removing, then the load demand of the vapour compression system exceeds the maximum capacity of the receiver compressor(s). Thus, under these circumstances, the receiver compressor(s) will not be able to maintain a desired pressure level in the receiver, even if the receiver compressor(s) is/are operated at maximum capacity. Therefore, when this happens, the pressure prevailing in the receiver is regulated by means of the bypass valve, i.e. the opening degree of the bypass valve is controlled in accordance with a setpoint control strategy, based on the first pressure setpoint. The first pressure setpoint represents a pressure level which is in fact desired for the pressure prevailing in the receiver. Thereby, a desired pressure level can be maintained in the receiver, also under unusual or extreme operating conditions, without the need for over-dimensioning the maximum capacity of the receiver compressor(s).

A desired pressure level in the receiver could, e.g., be a pressure level which ensures a suitable pressure drop across the expansion device, thereby ensuring a sufficient flow of refrigerant through the evaporator.

In the case that the receiver compressor(s) is/are operating and the load demand of the vapour compression system is below the maximum capacity of the receiver compressor(s), the opening degree of the bypass valve is controlled in order to regulate the pressure prevailing in the receiver in accordance with the second pressure setpoint, i.e. the higher pressure setpoint, and in order to reach the second pressure setpoint, i.e. in order to reach a pressure level in the receiver which is equal to the second pressure setpoint.

When the load demand of the vapour compression system is below the maximum capacity of the receiver compressor (s), the receiver compressor(s) is/are in fact capable of removing the required amount of gaseous refrigerant from the receiver. Therefore, in this case, and provided that at least one receiver compressor is operating, the pressure prevailing in the receiver is primarily regulated by means of the receiver compressor(s), i.e. the receiver compressor(s) is/are controlled in accordance with a setpoint control strategy, preferably based on the first pressure setpoint. However, the opening degree of the bypass valve is also controlled in accordance with a setpoint control strategy, but based on the second pressure setpoint, i.e. based on a pressure setpoint which is higher than the pressure level which is in fact desired for the pressure prevailing in the receiver. Thereby it is ensured that, if the receiver compressor(s) react slowly to changes in the load demand of the vapour compression system, thereby leading to an increase in the pressure prevailing in the receiver, then the bypass valve temporarily assists the receiver compressor(s) in controlling the pressure prevailing in the receiver. The receiver compressor(s) reacting slowly may, e.g., be due to restrictions regarding how frequently the compressor(s) is/are allowed to start and/or stop. However, by controlling the opening degree of the bypass valve in accordance with the second pressure setpoint, i.e. the higher pressure setpoint, it is ensured that the pressure prevailing in the receiver is still primarily controlled by means of the receiver compressor(s), and if the receiver compressor(s) succeed in reducing the pressure prevailing in the receiver to a pressure level below the second pressure setpoint, then the bypass valve will gradually close and leave the pressure control entirely to the receiver compressor(s).

Thus, the method according to the invention provides appropriate and energy efficient regulation of the pressure prevailing in the receiver, even under unusual or extreme operating condition with high load demand of the vapour compression system, without requiring over-dimensioning of the maximum capacity of the receiver compressor(s), and without risking conflicts between the control of the receiver compressor(s) and the control of the bypass valve.

The method may further comprise the steps of, in the case that the load demand of the vapour compression system is below a minimum capacity of the receiver compressor(s):

stopping the receiver compressor(s) or preventing start of the receiver compressor(s), and controlling the opening degree of the bypass valve in order to regulate the pressure prevailing in the receiver in accordance with the first pressure setpoint, and in order to reach the first pressure setpoint.

If the load demand of the vapour compression system is very low, the amount of gaseous refrigerant which needs to be removed from the receiver may be insufficient to ensure stable operation of the receiver compressor(s). This may lead to undesired repeatedly starting and stopping of the receiver compressor(s). Therefore, in the case that the load demand of the vapour compression system is below a minimum capacity of the receiver compressor(s), the receiver compressor(s) is/are stopped, if at least one receiver compressor is operating, or the receiver compressor(s) is/are prevented from starting if the receiver compressor(s) is/are not operating. Accordingly, when this situation occurs, the pressure prevailing in the receiver is regulated completely without the use of the receiver compressor(s).

Instead, the pressure prevailing in the receiver is regulated solely by means of the bypass valve. Accordingly, the opening degree of the bypass valve is controlled in order to regulate the pressure prevailing in the receiver in accordance with the first pressure setpoint, i.e. in accordance with the pressure setpoint which represents the pressure level which is in fact desired in the receiver. In other words, the opening degree of the bypass valve is controlled in accordance with a setpoint control strategy, based on the first pressure setpoint.

This even further ensures appropriate regulation of the pressure prevailing in the receiver without risking conflicts between the control of the receiver compressor(s) and control of the bypass valve, also under operating conditions with low load demand of the vapour compression system.

In the present context the term 'minimum capacity of the receiver compressor(s)' should be interpreted to mean the lowest possible operating capacity of the receiver compressor(s) which ensures stable operation without repeated stops and starts of the receiver compressor(s).

The method may further comprise the steps of, in the case that the load demand of the vapour compression system increases to a level above the minimum capacity of the receiver compressor(s):

closing the bypass valve, starting the receiver compressor(s) and controlling a capacity of the receiver compressor(s) in order to regulate the pressure prevailing in the receiver in accordance with the first pressure setpoint, and in order to reach the first pressure setpoint, and keeping the bypass valve closed as long as the pressure prevailing in the receiver is below the second pressure setpoint.

According to this embodiment, in the case that the receiver compressor(s) have been stopped due to a low load demand of the vapour compression system, as described above, the load demand of the vapour compression system is monitored. In the case that the load demand of the vapour compression system increases to a level above the minimum capacity of the receiver compressor(s), then it can be assumed that it will be possible to operate the receiver compressor(s) in a stable manner. It is therefore once again desirable to regulate the pressure prevailing in the receiver by means of the receiver compressor(s).

Therefore, when this occurs, the bypass valve is closed, and at least one receiver compressor is started, and the capacity of the receiver compressor(s) is controlled in order to regulate the pressure prevailing in the receiver in accordance with the first pressure setpoint, and in order to reach the first pressure setpoint. In other words, the capacity of the receiver compressor(s) is controlled in accordance with a setpoint control strategy, based on the first pressure setpoint.

Furthermore, the bypass valve is kept closed as long as the pressure prevailing in the receiver is below the second pressure setpoint. Thereby it is ensured that the pressure prevailing in the receiver is regulated purely by means of the receiver compressor(s) as long as the pressure prevailing in the receiver is below the second pressure setpoint, and thereby sufficiently close to the desired pressure level, i.e. the first pressure setpoint, to assume that the receiver compressor(s) is/are capable of appropriately regulating the pressure prevailing in the receiver without any assistance from the bypass valve. Thereby conflicts between control of the receiver compressor(s) and control of the bypass valve are efficiently prevented.

The method may further comprise the step of, in the case that the pressure prevailing in the receiver exceeds the second pressure setpoint, opening the bypass valve and subsequently controlling the opening degree of the bypass valve in order to regulate the pressure prevailing in the receiver in accordance with the second pressure setpoint, and in order to reach the second pressure setpoint.

According to this embodiment, if the pressure prevailing in the receiver increases to a level above the second pressure setpoint, the bypass valve is activated in order to assist the receiver compressor(s) in controlling the pressure prevailing in the receiver. Such an increase in the pressure prevailing in the receiver may, e.g., be due to the receiver compressor (s) being unable to react sufficiently fast to changes in the operating conditions.

Once the bypass valve has been opened for this purpose, the opening degree of the bypass valve is controlled in order to regulate the pressure prevailing in the receiver compressor in accordance with the second pressure setpoint, i.e. the higher pressure setpoint, and in order to reach the second pressure setpoint.

Accordingly, the opening degree of the bypass valve is not controlled in order to drive the pressure prevailing in the receiver all the way down to a level corresponding to the first pressure setpoint. Instead, the bypass valve will gradually close when the pressure prevailing in the receiver approaches the second pressure setpoint, thereby leaving the regulation of the pressure prevailing in the receiver to the receiver compressor(s) to a greater extent. It is, however, not ruled out that the bypass valve remains open, even if the pressure prevailing in the receiver decreases to a level below the second pressure setpoint. But once the bypass valve has been closed, it will remain closed as long as the pressure prevailing in the receiver is below the second pressure setpoint.

Thus, according to this embodiment, the opening degree of the bypass valve is controlled in accordance with a 'half side hysteresis' control strategy, which leaves the regulation of the pressure prevailing in the receiver to the receiver compressor(s) to the greatest possible extent. However, in the case that the receiver compressor(s) is/are unable to react sufficiently fast to changes in the operating conditions, the bypass valve is activated in order to assist the receiver compressor(s), but only to the extent which is necessary, thereby minimising the risk of control conflicts between the receiver compressor(s) and the bypass valve.

The second pressure setpoint may be between 1 bar and 10 bar higher than the first pressure setpoint, such as between 1 bar and 8 bar, such as between 2 bar and 4 bar.

A large difference between the first pressure setpoint and the second pressure setpoint ensures that the receiver compressor is applied to a great extent, but allows the pressure prevailing in the receiver to depart far from the first pressure setpoint, and thereby from a desired pressure level, before opening the bypass valve. On the other hand, a small difference between the first pressure setpoint and the second pressure setpoint will prevent the pressure prevailing in the receiver from departing far from the desired pressure level, but will cause the bypass valve to open further and more frequently, and the receiver compressor will thereby be utilised to a lesser extent. A difference between the first pressure setpoint and the second pressure setpoint within the interval of 1 bar to 10 bar provides a suitable balance between these two objects.

Thus, the method may further comprise, if the bypass valve is closed, keeping the bypass valve closed as long as the pressure prevailing in the receiver is below the second pressure setpoint. This may be the case regardless of the reason why the bypass valve was closed.

The method may further comprise the step of, in the case that the pressure prevailing in the receiver increases from a pressure level below the second pressure setpoint to a pressure level above the second pressure setpoint, opening the bypass valve and subsequently controlling the opening degree of the bypass valve in order to regulate the pressure prevailing in the receiver in accordance with the second pressure setpoint, and in order to reach the second pressure setpoint.

According to this embodiment, once the bypass valve has been closed, it remains closed as long as the pressure prevailing in the receiver is below the second pressure setpoint. If the pressure prevailing in the receiver increases to a level above the second pressure setpoint, the bypass valve is opened and controlled in the manner described above. Accordingly, the opening degree of the bypass valve is controlled in accordance with a 'half side hysteresis' control strategy.

The method may further comprise the step of operating the receiver compressor(s) at maximum capacity while the load demand of the vapour compression system exceeds the maximum capacity of the receiver compressor(s) and the opening degree of the bypass valve is controlled in order to regulate the pressure prevailing in the receiver in accordance with the first pressure setpoint, and in order to reach the first pressure setpoint.

According to this embodiment, when the load demand of the vapour compression system is very high and exceeds the maximum capacity of the receiver compressor(s), the receiver compressor(s) is/are kept operating at maximum capacity, thereby ensuring that the receiver compressor(s) is/are applied to the greatest possible extent.

However, since the load demand of the vapour compression system exceeds the maximum capacity of the receiver compressor(s), this is not sufficient to maintain the pressure prevailing in the receiver at the desired pressure level. Therefore, the regulation of the pressure prevailing in the receiver is now left to the bypass valve. Accordingly, the opening degree of the bypass valve is controlled in order to regulate the pressure prevailing in the receiver in accordance with the first pressure setpoint, and in order to reach the first pressure setpoint.

Thus, according to this embodiment it is possible to maintain a desired pressure level in the receiver, even under extreme operating conditions, without having to over-dimension the capacity of the receiver compressor(s), because the bypass valve acts as a 'back up' for the receiver compressor(s) under such circumstances.

BRIEF DESCRIPTION OF THE DRAWINGS

The invention will now be described in further detail with reference to the accompanying drawings in which.

DETAILED DESCRIPTION

Figure 1:
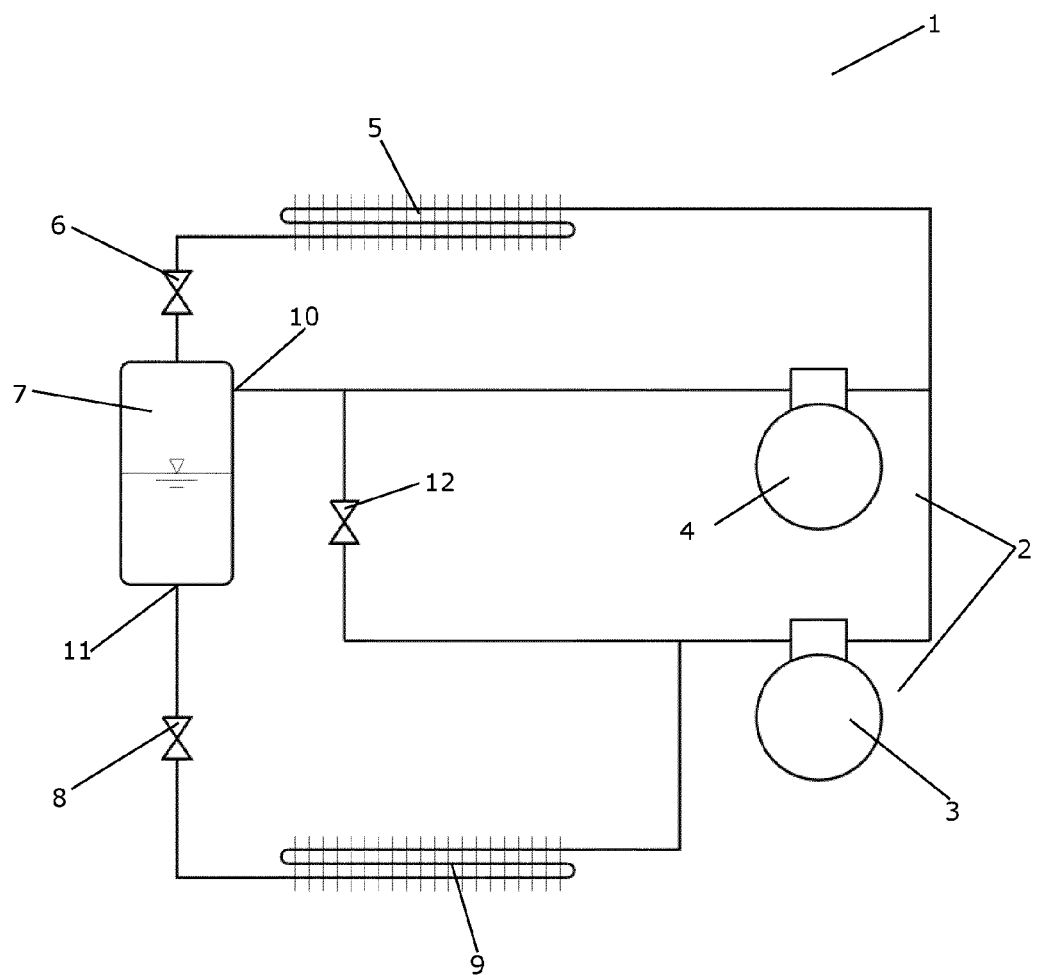
FIG. 1 is a diagrammatic view of a vapour compression system being controlled in accordance with a method according to the invention.

FIG. 1 is a diagrammatic view of a vapour compression system 1 being controlled in accordance with a method according to an embodiment of the invention. The vapour compression system 1 comprises a compressor unit 2 comprising at least two compressors 3, 4, two of which are shown, a heat rejecting heat exchanger 5, a high pressure valve 6, a receiver 7, an expansion valve 8 and an evaporator 9 arranged in a refrigerant path. Compressor 3 is a main compressor which is fluidly connected to an outlet of the evaporator 9, and compressor 4 is a receiver compressor which is fluidly connected to a gaseous outlet 10 of the receiver 7.

Refrigerant flowing in the refrigerant path is compressed by the compressors 3, 4 before being supplied to the heat rejecting heat exchanger 5. In the heat rejecting heat exchanger 5, heat exchange takes place between the refrigerant flowing through the heat rejecting heat exchanger 5 and the ambient or a secondary fluid flow across the heat rejecting heat exchanger 5, in such a manner that heat is rejected from the refrigerant.

The refrigerant leaving the heat rejecting heat exchanger 5 is passed through the high pressure valve 6, where it undergoes expansion before being supplied to the receiver 7. In the receiver 7, the refrigerant is separated into a liquid part and a gaseous part. The liquid part of the refrigerant leaves the receiver 7 via a liquid outlet 11, and is supplied to the expansion device 8, where it undergoes expansion before being supplied to the evaporator 9. The refrigerant being supplied to the evaporator 9 is thereby in a mixed gaseous and liquid state.

In the evaporator 9, heat exchange takes place between the refrigerant flowing through the evaporator 9 and the ambient or a secondary fluid flow across the evaporator 9, in such a manner that heat is absorbed by the refrigerant, while the liquid part of the refrigerant is at least partly evaporated. Finally, the refrigerant leaving the evaporator 9 is supplied to the main compressor 3.

The gaseous part of the refrigerant in the receiver 7 may leave the receiver via the gaseous outlet 10. The gaseous refrigerant may either be supplied directly to the receiver compressor 4, or it may be supplied to the main compressor 3, via a bypass valve 12. Thereby the pressure prevailing in the receiver 7 may be regulated either by appropriately controlling the capacity of the receiver compressor 4 or by appropriately controlling an opening degree of the bypass valve 12.

When the vapour compression system 1 of FIG. 1 is controlled in accordance with a method according to an embodiment of the invention, the capacity of the receiver compressor 4 and the opening degree of the bypass valve 12 are respectively controlled in a manner which ensures efficient regulation of the pressure prevailing in the receiver 7, while it is ensured that control of the receiver compressor 4 and the control of the bypass valve 12 are not in conflict. This may, e.g., be obtained in the manner described below with reference to FIG. 2.

Figure 2:
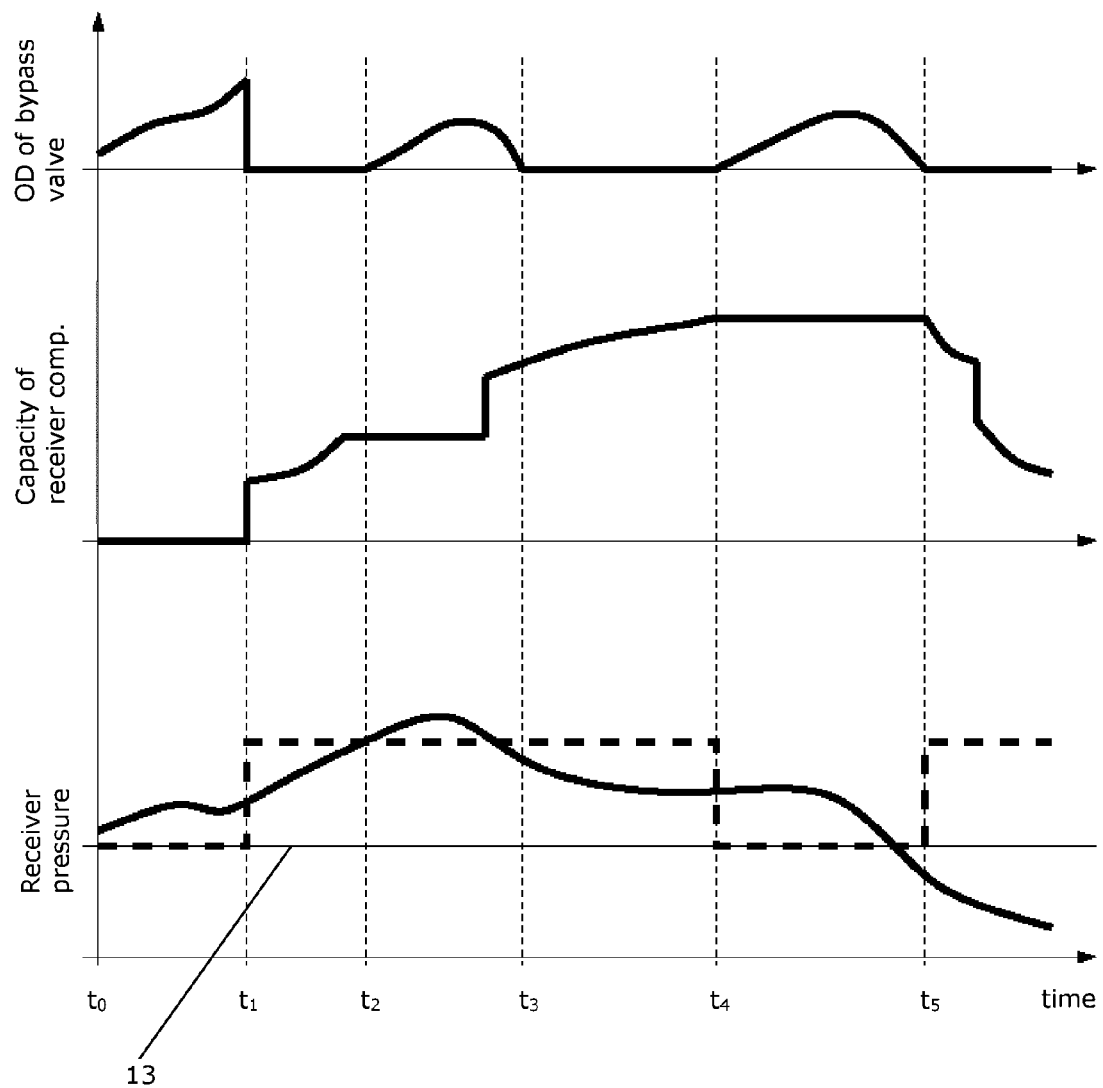
FIG. 2 is a set of graphs illustrating a method according to an embodiment of the invention.

FIG. 2 is a set of graphs illustrating a method for controlling a vapour compression system according to an embodiment of the invention. The vapour compression system may, e.g., be the vapour compression system illustrated in FIG. 1.

The upper graph illustrates opening degree of the bypass valve as a function of time. The middle graph illustrates capacity of the receiver compressor as a function of time. The lower graph illustrates receiver pressure as a function of the time. The dotted line in the lower graph illustrates pressure setpoint applied for the control of the opening degree of the bypass valve as a function of time. The pressure setpoint can be varied between a first pressure setpoint, corresponding to continuous line 13, and a second, higher, pressure setpoint. This will be described in further detail below. The first pressure setpoint represents a pressure level which is desired in the receiver.

Between time $t_0$ and time $t_1$, the load demand of the vapour compression system is low, and below a minimum capacity of the receiver compressor. Accordingly, the amount of gaseous refrigerant which needs to be removed from the receiver is insufficient to allow stable operation of the receiver compressor. Therefore, the receiver compressor remains in a stopped condition, and the pressure prevailing in the receiver is instead regulated by means of the bypass valve. Accordingly, the opening degree of the bypass valve is controlled in order to regulate the pressure prevailing in the receiver in accordance with a first, low, pressure setpoint. It can be seen that this causes the opening degree of the bypass valve to gradually increase.

At time $t_1$, the load demand of the vapour compression system increases to a level which is above the minimum capacity of the receiver compressor. Accordingly, it is now possible to operate the receiver compressor in a stable manner. Therefore, the receiver compressor is started, and the capacity of the receiver compressor is controlled in order to regulate the pressure prevailing in the receiver in accordance with the first pressure setpoint. Simultaneously, the pressure setpoint for the opening degree of the bypass valve is changed from the first pressure setpoint to a second, high, pressure setpoint. Since the pressure prevailing in the receiver is significantly below the second pressure setpoint, this causes the bypass valve to close. Accordingly, the pressure prevailing in the receiver is now regulated purely by means of the receiver compressor. It can be seen that the capacity of the receiver compressor subsequently increases as a function of time, in an attempt by the receiver compressor to obtain a pressure in the receiver which is equal to the first pressure setpoint. It can also be seen that, despite of this, the pressure prevailing in the receiver continues to increase. However, the bypass valve remains closed as long as the pressure prevailing in the receiver is below the second pressure setpoint, in order to ensure that the pressure prevailing in the receiver is primarily regulated by means of the receiver compressor and in order to avoid conflict between the control of the receiver compressor and the control of the bypass valve.

At time $t_2$ the pressure prevailing in the receiver increases above the second pressure setpoint, even though the receiver compressor is not yet operating at its maximum capacity, and the receiver compressor therefore should be able to regulate the pressure prevailing in the receiver to reach the first pressure setpoint. This may, e.g., be because the receiver compressor reacts too slowly to changes in operating conditions. Therefore, in order to assist the receiver compressor, the bypass valve is opened, and the opening degree of the bypass valve is controlled in accordance with the second pressure setpoint. It can be seen that this causes the pressure prevailing in the receiver to decrease, and as the pressure prevailing in the receiver approaches the second pressure setpoint, the bypass valve starts to gradually close, until it is completely closed at time $t_3$. Accordingly, from time $t_3$ to time $t_4$, the pressure prevailing in the receiver is regulated purely by means of the receiver compressor, because the bypass valve is not allowed to open as long as the pressure prevailing in the receiver is below the second pressure setpoint.

At time $t_4$, the receiver compressor reaches maximum capacity, but the pressure prevailing in the receiver is well above the first pressure setpoint. Accordingly, the load demand of the vapour compression system now exceeds the maximum capacity of the receiver compressor. Therefore, the pressure setpoint for the bypass valve is changed from the second pressure setpoint to the first pressure setpoint. Since the pressure prevailing in the receiver is above the first pressure setpoint, this causes the bypass valve to open, and the pressure prevailing in the receiver is now in reality regulated by means of the bypass valve, while the receiver compressor continues to operate at maximum capacity, in order to ensure that the receiver compressor is applied to the greatest possible extent. Thus, in this situation the bypass valve provides a 'back up capacity' for the receiver compressor, and these extreme conditions can be handled without the need for over-dimensioning the maximum capacity of the receiver compressor.

At time $t_5$, the pressure prevailing in the receiver has reached a level which is sufficiently below the first pressure setpoint to cause the bypass valve to close. In response thereto, the pressure setpoint for the bypass valve is changed from the first pressure setpoint to the second pressure setpoint, in order to ensure that the bypass valve remains closed as long as the pressure prevailing in the receiver is below the second pressure setpoint. Accordingly, the receiver compressor once again takes over the responsibility for regulating the pressure prevailing in the receiver.

While the present disclosure has been illustrated and described with respect to a particular embodiment thereof, it should be appreciated by those of ordinary skill in the art that various modifications to this disclosure may be made without departing from the spirit and scope of the present disclosure.

What is claimed is:

1. A method for controlling a vapour compression system, the vapour compression system comprising a compressor unit comprising at least two compressors, a heat rejecting heat exchanger, a receiver, an expansion device and an evaporator being arranged in a refrigerant path, the expansion device being arranged to control a supply of refrigerant to the evaporator, at least one of the compressors being a main compressor being fluidly connected to an outlet of the evaporator and at least one of the compressors being a receiver compressor being fluidly connected to a gaseous outlet of the receiver, the vapour compression system further comprising a bypass valve fluidly interconnecting the gaseous outlet of the receiver and the main compressor, the method comprising the steps of:
defining a first pressure setpoint for a pressure prevailing in the receiver and a second pressure setpoint for the pressure prevailing in the receiver, the second pressure setpoint being higher than the first pressure setpoint, and
controlling an opening degree of the bypass valve,
wherein the opening degree of the bypass valve is controlled in order to regulate the pressure prevailing in the receiver in accordance with the first pressure setpoint, and in order to reach the first pressure setpoint, in the case that a load demand of the vapour compression system exceeds a maximum capacity of the receiver compressor, and wherein the opening degree of the bypass valve is controlled in order to regulate the pressure prevailing in the receiver in accordance with the second pressure setpoint, and in order to reach the second pressure setpoint, in the case that the receiver compressor is operating and the load demand of the vapour compression system is below the maximum capacity of the receiver compressor.

2. A method for controlling a vapour compression system, the vapour compression system comprising a compressor unit comprising at least two compressors, a heat rejecting heat exchanger, a receiver, an expansion device and an evaporator being arranged in a refrigerant path, the expansion device being arranged to control a supply of refrigerant to the evaporator, at least one of the compressors being a main compressor being fluidly connected to an outlet of the evaporator and at least one of the compressors being a receiver compressor being fluidly connected to a gaseous outlet of the receiver, the vapour compression system further comprising a bypass valve fluidly interconnecting the gaseous outlet of the receiver and the main compressor, the method comprising the steps of:
defining a first pressure setpoint for a pressure prevailing in the receiver and a second pressure setpoint for the pressure prevailing in the receiver, the second pressure setpoint being higher than the first pressure setpoint, and
controlling an opening degree of the bypass valve,
wherein the opening degree of the bypass valve is controlled in order to regulate the pressure prevailing in the receiver in accordance with the first pressure setpoint, and in order to reach the first pressure setpoint, in the case that a load demand of the vapour compression system exceeds a maximum capacity of the receiver compressor, and wherein the opening degree of the bypass valve is controlled in order to regulate the pressure prevailing in the receiver in accordance with the second pressure setpoint, and in order to reach the second pressure setpoint, in the case that the receiver compressor is operating and the load demand of the vapour compression system is below the maximum capacity of the receiver compressor;
further comprising the steps of, in the case that the load demand of the vapour compression system is below a minimum capacity of the receiver compressor:
stopping the receiver compressor or preventing start of the receiver compressor and
controlling the opening degree of the bypass valve in order to regulate the pressure prevailing in the receiver in accordance with the first pressure setpoint, and in order to reach the first pressure setpoint.

3. The method according to claim 2, further comprising the steps of, in the case that the load demand of the vapour compression system increases to a level above the minimum capacity of the receiver compressor:
closing the bypass valve,
starting the receiver compressor and controlling a capacity of the receiver compressor in order to regulate the pressure prevailing in the receiver in accordance with the first pressure setpoint, and in order to reach the first pressure setpoint, and keeping the bypass valve closed as long as the pressure prevailing in the receiver is below the second pressure setpoint.

4. The method according to claim 3, further comprising the step of, in the case that the pressure prevailing in the receiver exceeds the second pressure setpoint, opening the bypass valve and subsequently controlling the opening degree of the bypass valve in order to regulate the pressure prevailing in the receiver in accordance with the second pressure setpoint, and in order to reach the second pressure setpoint.

5. The method according to claim 1, wherein the second pressure setpoint is between 1 bar and 10 bar higher than the first pressure setpoint.

6. A method for controlling a vapour compression system, the vapour compression system comprising a compressor unit comprising at least two compressors, a heat rejecting heat exchanger, a receiver, an expansion device and an evaporator being arranged in a refrigerant path, the expansion device being arranged to control a supply of refrigerant to the evaporator, at least one of the compressors being a main compressor being fluidly connected to an outlet of the evaporator and at least one of the compressors being a receiver compressor being fluidly connected to a gaseous outlet of the receiver, the vapour compression system further comprising a bypass valve fluidly interconnecting the gaseous outlet of the receiver and the main compressor, the method comprising the steps of:

defining a first pressure setpoint for a pressure prevailing in the receiver and a second pressure setpoint for the pressure prevailing in the receiver, the second pressure setpoint being higher than the first pressure setpoint, and controlling an opening degree of the bypass valve, wherein the opening degree of the bypass valve is controlled in order to regulate the pressure prevailing in the receiver in accordance with the first pressure setpoint, and in order to reach the first pressure setpoint, in the case that a load demand of the vapour compression system exceeds a maximum capacity of the receiver compressor, and wherein the opening degree of the bypass valve is controlled in order to regulate the pressure prevailing in the receiver in accordance with the second pressure setpoint, and in order to reach the second pressure setpoint, in the case that the receiver compressor is operating and the load demand of the vapour compression system is below the maximum capacity of the receiver compressor;

wherein if the bypass valve is closed, keeping the bypass valve closed as long as the pressure prevailing in the receiver is below the second pressure setpoint.

7. The method according to claim 6, further comprising the step of, in the case that the pressure prevailing in the receiver increases from a pressure level below the second pressure setpoint to a pressure level above the second pressure setpoint, opening the bypass valve and subsequently controlling the opening degree of the bypass valve in order to regulate the pressure prevailing in the receiver in accordance with the second pressure setpoint, and in order to reach the second pressure setpoint.

8. The method according to claim 1, further comprising the step of operating the receiver compressor at maximum capacity while the load demand of the vapour compression system exceeds the maximum capacity of the receiver compressor and the opening degree of the bypass valve is controlled in order to regulate the pressure prevailing in the receiver in accordance with the first pressure setpoint, and in order to reach the first pressure setpoint.

9. The method according to claim 2, wherein the second pressure setpoint is between 1 bar and 10 bar higher than the first pressure setpoint.

10. The method according to claim 3, wherein the second pressure setpoint is between 1 bar and 10 bar higher than the first pressure setpoint.

11. The method according to claim 4, wherein the second pressure setpoint is between 1 bar and 10 bar higher than the first pressure setpoint.

12. The method according to claim 2, wherein if the bypass valve is closed, keeping the bypass valve closed as long as the pressure prevailing in the receiver is below the second pressure setpoint.

13. The method according to claim 3, wherein if the bypass valve is closed, keeping the bypass valve closed as long as the pressure prevailing in the receiver is below the second pressure setpoint.

14. The method according to claim 4, wherein if the bypass valve is closed, keeping the bypass valve closed as long as the pressure prevailing in the receiver is below the second pressure setpoint.

15. The method according to claim 5, wherein if the bypass valve is closed, keeping the bypass valve closed as long as the pressure prevailing in the receiver is below the second pressure setpoint.

* * * * *